United States Patent [19]

Radford et al.

[11] Patent Number: 4,826,630

[45] Date of Patent: * May 2, 1989

[54] BURNABLE NEUTRON ABSORBERS

[75] Inventors: Kenneth C. Radford, Pittsburgh; William C. Carlson, Murrysville, both of Pa.

[73] Assignee: Westinghouse Electric Corp., Pittsburgh, Pa.

[*] Notice: The portion of the term of this patent subsequent to Jan. 28, 2003 has been disclaimed.

[21] Appl. No.: 352,686

[22] Filed: Feb. 26, 1982

Related U.S. Application Data

[63] Continuation-in-part of Ser. No. 334,720, Dec. 28, 1981, Pat. No. 4,474,728.

[51] Int. Cl.$^4$ .................... G21C 7/04; G21C 21/18
[52] U.S. Cl. .................... 252/478; 264/122; 264/125; 376/339
[58] Field of Search .................... 264/13, 60, 63, 66, 264/67, 0.5, 122, 125; 376/339; 419/14, 17, 19, 32, 36, 40, 42, 65, 68; 252/478

[56] References Cited

U.S. PATENT DOCUMENTS

| | | | |
|---|---|---|---|
| 2,727,996 | 12/1955 | Rockwell, III et al. | 376/458 |
| 3,088,898 | 5/1963 | Busby et al. | 376/339 |
| 3,121,128 | 2/1964 | O'Leary et al. | 264/63 |
| 3,234,104 | 2/1966 | Gale et al. | 376/327 |
| 3,243,349 | 3/1966 | Goeddel | 376/327 |
| 3,245,782 | 4/1966 | Ray | 376/339 |
| 3,255,092 | 6/1966 | Dee, Jr. | 376/333 |
| 3,320,176 | 5/1967 | Davis | 264/0.5 |
| 3,325,363 | 6/1967 | Goeddel et al. | 376/410 |
| 3,361,857 | 1/1968 | Rose | 264/0.5 |
| 3,372,213 | 3/1968 | Nisbiyama et al. | 264/0.5 |
| 3,540,894 | 11/1970 | McIntosh | 264/61 |
| 3,565,762 | 2/1971 | Nickel | 376/338 |
| 3,759,786 | 9/1973 | Abate-Daga et al. | 264/0.5 |
| 3,796,564 | 3/1974 | Taylor et al. | 419/60 |
| 3,884,839 | 5/1975 | Bon et al. | 376/288 |
| 3,912,798 | 10/1975 | Rachor et al. | 264/0.5 |
| 3,953,286 | 4/1976 | Watson et al. | 264/0.5 |
| 4,025,388 | 5/1977 | Jackson | 376/339 |
| 4,522,744 | 6/1985 | Argall et al. | 252/478 |
| 4,566,989 | 1/1986 | Radford et al. | 376/339 |

FOREIGN PATENT DOCUMENTS 2133017 of 1972 France .

OTHER PUBLICATIONS

Lenel, Fritz V., *Powder Metallurgy*, Metal Powder Industries Federation, New Jersey, 1980, pp. 387-389.

*Primary Examiner*—Deborah L. Kyle
*Assistant Examiner*—Richard W. Wendtland

[57] ABSTRACT

Annular pellets of burnable poison specifically boron carbide, B$_4$C, in a matrix of a refractory material, specifically aluminum oxide, Al$_2$O$_3$, are produced. The pellets are of small wall thickness. Powders of the Al$_2$O$_3$ and the B$_4$C are milled in a ball mill in water in which a wetting agent, a surfactant and a deflocculant are included to produce a slurry. Organic binders and plasticizers are added. Then the slurry is spray dried in a centrifugal separator. The resulting powder is poured into a mold and a turbular green body is formed by isostatic pressure. The tube may be sintered to size as a whole and then cut into lengths; i.e., pellets, or the green body may be cut into green-body pellets which are then sintered.

13 Claims, 8 Drawing Sheets

BURNABLE NEUTRON ABSORBERS

CROSS REFERENCE TO RELATED APPLICATIONS

This application is a continuation-in-part of application Ser. No. 334,720, filed Dec. 28, 1981, now U.S. Pat. No. 4,474,728, granted Oct. 3, 1984, to Kenneth C. Radford for *Neutron Absorber Pellets With Modified Microstructure* and assigned to Westinghouse Electric Corporation (herein Radford application) relates to this application. This application, and Radford application also relate to application Ser. No. 915,691 filed June 15, 1978 to W. L. Orr and P. Doshi for Low-Reactivity Penalty Burnable Poison Rods and assigned to Westinghouse Electric Corporation now abandoned (herein Orr application).

Orr application and Radford Application are incorporated herein by reference.

BACKGROUND OF THE INVENTION

This invention relates to nuclear reactors and to burnable neutron absorbers for such reactors. This invention relates particularly to neutron-absorbers such as are disclosed in Orr application. Orr discloses a neutron-absorber assembly including annular neutron-absorber pellets in a closed annular chamber or cavity between coaxial cylinders of Zircaloy alloy. The pellets are composed of ceramics including a matrix of a highly refractory material in which is embedded or encapsulated a burnable poison or burnable neutron-absorber. Typical matrix material are aluminum oxide, $Al_2O_3$, and zirconium oxide, $ZrO_2$. Certain isotopes of the elements boron, gadolinium, samarium, cadmium, europium, hafnium, dysprosium, and indium are burnable neutron absorbers. One or more of these elements in their natural state or enriched in the neutron-absorbing isotopes are encapsulated in the matrix.

As used in this application, the expression "neutron-absorber" means the material which captures neutrons; the expression "neutron-absorber body" means the body including the neutron-absorber in a matrix, also sometimes referred to as a "ceramic", and includes within its meaning a "pellet" as well as the body from which pellets are cut; the expression "neutron-absorber assembly" or "neutron-absorber rod" means the apparatus including the chambers with the pellets therein.

Usually the neutron-absorber, natural or enriched, is encapsulated as a compound. Of particular interest is boron whose isotope boron 10 is a neutron absorber. Typical ceramics are a matrix of $Al_2O_3$ encapsulating $B_4C$ or a matrix $ZrO_2$ encapsulating zirconium boride, $ZrB_2$. $B_4C$ with depleted boron also may serve as a material for a burnable poison. The $Al_2O_3 + B_4C$ ceramic and the $ZrO_2$ and $ZrB_2$ ceramic may include natural boron or boron enriched or depleted in $B^{10}$ with the quantity $B^{10}$ varied depending on the radial wall thickness and density of the pellets and the purpose which it is to serve. In the $B_4C$ with the depleted $B^{10}$, the $B^{10}$ is set to yield the required $B^{10}$ loading per foot of the pellet. The primary neutron-absorber body includes a matrix of $Al_2O_3$ encapsulating $B_4C$.

Since $Al_2O_3$ and $B_4C$ are most commonly used as matrix and neutron absorber, the text of this application deals predominantly with these constituents. It is to be understood that it is not intended that the invention should be confined to these compounds. To the extent that this invention is practiced with other compounds, either for the matrix or for the burnable absorber, such practice is regarded as within the scope of equivalents of the invention under the doctrine of equivalents as this doctrine is defined and explained by the U.S. Supreme Court in Graver Tank & Mfg. Co., Inc. et al. v. Linde Air Products Co. 339 U.S. 605; 70 S. Ct. 1017 (1950).

It has been proposed that the annular pellets be produced by forming a green body of powders of the matrix and the neutron absorber, sintering the green body and cutting and machining or grinding the resultign body to size. Typically the finished pellet so produced is about 2 inches in length. In the interest of economy, particularly to avoid excessive scrap in the finishing of individual pellets, and in the interest of practicability, a green body is produced which after sintering may be severed into blanks for forming several neutron-absorber bodies or pellets. Typically the cylinder is a tube 7 or 8 inches in length. About 2 to 3 finished pellets are derived from a 7 or 8 inch tube. The practice has been to grind the inside and outside of the sintered pellets. This is a costly and time-consuming operation. It is desirable that the grinding step be dispensed with.

Structurally the annular pellets are subject to critical demands. Annular pellets of very small radial dimension; i.e. radial thickness, and of very tight tolerances are required. The thickness (radially) is typically between 0.020 and 0.040 inches. The typical spacing between the outer diameter of the inner cylinder of Zircaloy alloy and the inner diameter of the outer cylinder is relatively small. It is then necessary that the dimensions of the pellet, particularly its radial thickness, shall be maintained within tight limits. Because precise $B^{10}$ loading is essential to reactor operation, the density and wall thickness of the pellets are critical. In the operation of a reactor the nuclear reaction between the neutrons which bombard the $B^{10}$ results in the formation of helium. In addition the bombardment of the pellets by neutrons displaces the atoms of the ceramic causing it to swell. The ceramics of which the pellets are formed are then porous, typically between about 60 and 80 percent of theoretical density. The requirement that the density be microscopically uniform applies to the percent theoretical density. The swelling and the emission of helium subjects the pellets to substantial pressure. It is then required that the pellets have substantial strength so that they can withstand the pressure. It is essential that this requirement be met since the pellets have small radial thickness. Not only must these properties of the pellets be uniform but they must also be reproducible from pellet to pellet of any batch of material for producing the pellets, and from batch to batch. These demands are applicable to the relatively long cylinder from which the pellets are formed. It is necessary that a long cylinder having a truly linear axis about which it is symmetric be formed and that this cylinder have uniform densityand wall thickness throughout. Such demands call for sophisticated manufacturing practice.

It is an object of this invention to provide a method for producing economically, burnable neutron-absorber bodies or pellets meeting the above demands. It is contemplated that this object will be met by forming a green body from the products of the components and sintering the green body to size, thus dispensing, to the extent practicable, with a final grinding.

SUMMARY OF THE INVENTION

In accordance with this invention there is provided ceramic processing including sintering schedules in whose practice annular pellets having the properties and precision demanded are sintered to size. In the practice of this invention a homogeneous ceramic powder of the constituents of the matrix and of the neutron absorber is prepared. During the sintering atoms of the matrix diffuse throughout the original green body and the body shrinks. It is desirable that the ceramic powder be so homogeneous as to preclude the occurrence of inhomogeneous shrinking during sintering. Typically the powder includes $Al_2O_3$ and $B_4C$ and the content of $B_4C$ in the powder in weight percent is about 1 to 50.

In the practice of this invention the $Al_2O_3$ and $B_4C$ appropriately sized are milled in a ball mill with liquid to produce a slurry. The slurry is spray dried to produce small spheres of the mixed powder. This powder, containing adequate organic binder and plasticizer, is formed into a hollow green b ody having the shape of a tube. The green body is sintered to produce a ceramic tube from which the pellets are cut. The tube is sintered to size so that the pellets have the required dimensions.

It is an important feature of this invention that the powder is formed into the green body by applying isostatic pressure to the powder. It has been found that by the use of the isostatic pressure precisely dimensioned pellets of the requisite strength and of uniform density and wall thickness, meeting all of the above demands, are produced. The inner diameter of the pellets is precisely dimensioned. The outer diameter usually requires minimal grinding.

In arriving at this invention other modes than isostatic pressure for forming the green bodies were considered. Uniaxial cold pressing results in density variations along the length of the compacted body. The uniform density and wall thickness along the length of the pellet which is demanded could at best be achieved only for a very short pellet, less than ¼ inch in length. This method is not practicable for forming the green bodies. Extrusion of the ceramic tubes would require a large quantity of organic binder and plasticizer material. The sintered body would then have excessive porosity (and low strength) and would have density variations along its length. During sintering uneven shrinkages would also occur so that the cross section of the ceramic tubes would not be substantially perfectly circular and the tubes would be bent. Isostatic pressing is readily controllable. A minimum of organic binder and plasticizer is required to give the green body strength. By appropriate control of the ceramic powder processing, uniform shrinkage during the sintering following the isostatic pressing may be assured. The green tube may then be sintered directly to size. Also, tube length and other dimensions can be made to suit the requirements for rod loading, i.e. the loading of the neutron-absorber assembly. Typically the length of a pellet is between 1 and 2 inches.

For a better understanding of this invention, both as to its organization and as to its method of operation, together with additional objects and advantages thereof, reference is made to the following description taken in conjunction with the accompanying drawing in which.

DETAILED DESCRIPTION OF THE INVENTION

Figure 1:
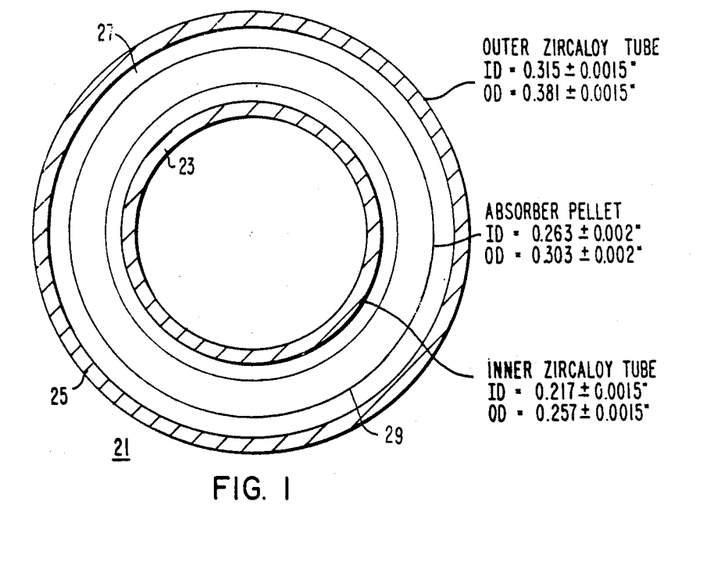
FIG. 1 is a view in transverse section of a burnable neutron-absorber rod or assembly whose burnable pellets are produced in the practice of this invention.

FIG. 1 shows a neutron-absorber rod 21 including inner hollow cylinder 23 and outer hollow cylinder 25. These cylinders are sealed at their ends and define an annular chamber 27 in which pellets 29 made in accordance with this invention are stacked coaxially with the cylinders. Orr application shows the rod 21 in more detail. FIG. 1 shows typical dimensions of the cylinders 23 and 25 and the pellet 29. It is emphasized that the diameters of the cylinders must be maintained to within plus or minus 0.0015" and the diameter of the pellet to within plus or minus 0.002". This invention concerns itself with the producing of these pellets to size with a minimum of grinding or other machining processes.

Figure 2:
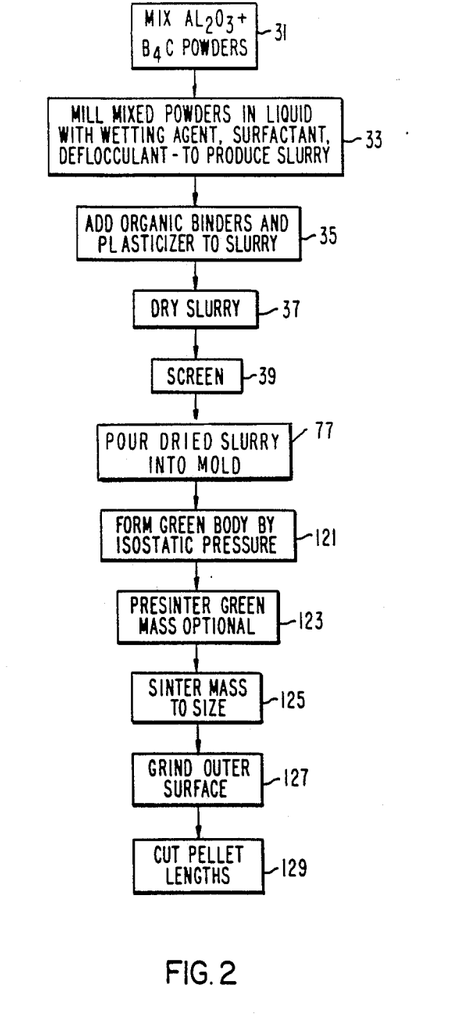
FIG. 2 is a flow chart showing the practice of this invention.

The pellets 29 are ceramics produced by following the steps shown in the flow chart of FIG. 2. In the first step 31 the $Al_2O_3$ and $B_4C$ powders are mixed. The starting mean size of the $B_4C$ powder is about 1 to 30 microns; 5 to 15 microns mean size is preferred. The starting mean size of the $Al_2O_3$ is 1 to 20 microns.

To homogenize the powders and eliminate coarse agglomerates several hundred microns in size, the powders are milled and ground in a ball mill in the second step 33. This process permits intimate mixing of the constituents $Al_2O_3$ and $B_4C$. To aid in the comminution and homogenation, the powders are mixed in a liquid, typically deionized water. Small but effective quantities of a wetting agent, surfactant and deflocculant are added to the liquid. A small but effective quantity of a thixotropic agent may be added. The surfactant aids in imparting wetting qualities to the liquid. The deflocculant suppresses the formation of agglomerates. The thixotropic agent imparts a fluid property to the powder when it is agitated preventing the larger particles from settling out. The powders are milled for about 1 to 2 hours producing a slurry including about 40% by weight of the powder. Organic binders and plasticizers are added to the slurry in the third step 35 and the milling is continued for ½ hour to 1 hour. The binders and plasticizers may also be added earlier in the processing, in the first or second step 31 or 33. The slurry is then spray dried in the next step 37 and screened in step 39. The screening eliminates large agglomerates from the powder. The result of the drying and screening is to produce free-flowing spheres of 30 to 50 microns mean diameter. The spheres are predominantly $Al_2O_3$ with $B_4C$ particles embedded therein. The spheres may be smaller than 30 microns or larger than 50 microns, depending on the spray-drying equipment or its operation.

Figure 3:
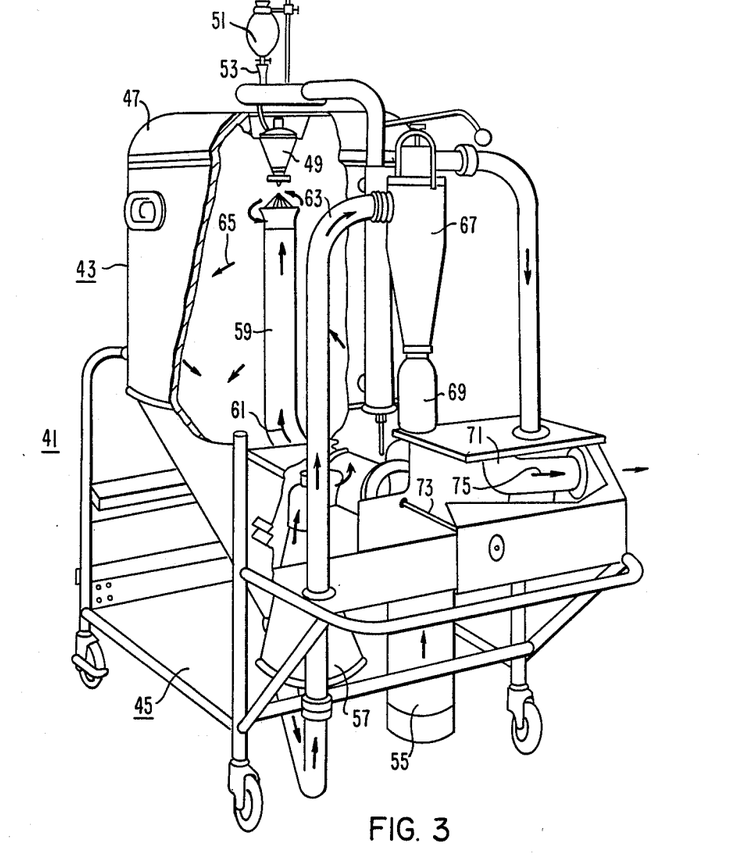
FIG. 3 is a view in perspective showing the apparatus for drying the slurry in the practice of this invention.

Typically the slurry is spray dried in a centrifugal-separator apparatus 41 as shown in FIG. 3. Such apparatus may be procured from Niro Atomizer, Inc., Columbia, Md. This apparatus 41 includes a chamber 43 mounted on a movable support 45 formed of metal tubes. Under the top 47 of the chamber a rotatable centrifugal atomizer 49 is mounted. A feed device 51 for the slurry, which may be a hopper or the like, is mounted above the top 47 and is connected to the atomizer 49 through conductor 53. Heated air is supplied to dry the slurry emitted by the atomizer 49. The air is heated by a gas heater 55 and an electric heater 57 and flows to the region around the atomizer 49 through a conductor 59. Arrows 61 show the path of the heated air. The resulting mixture of gas and particulate flows through the chamber 43 and through conductor 63 as shown by the arrows 65 to a cyclone 67. The powder is separated from the gas in the cyclone and is deposited in container 69. An exhaust fan 71 controlled by a damper 73 is provided for exhausting the air as represented by the arrows 75. The air heated by the heaters 55 and 57 enters the chamber 43 at a temperature of about 300° C. and is at a temperature of between 100° C. and 125° C. in the region of the atomizer 49.

Figure 6:
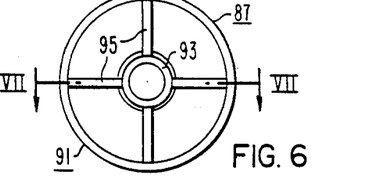
FIG. 6 is a plan view showing the funnel used for pouring the mixed powder into the mold and its relationship to the mandrel of the mold.
Figure 7:
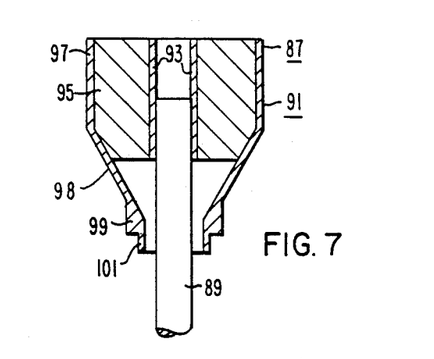
FIG. 7 is a view in transverse section taken along line VII—VII of FIG. 6.

In the next step (77, FIG. 2) the dried powder is poured into a mold 79. The mold 79 (FIGS. 4-9) is of the multiple type. It includes a body 81 in which there are a plurality of cavities 83 (7 in the mold shown in FIG. 4). The mold 79 is formed of a material such as polyurethane which is capable of transmitting pressure. The mold with its cavities may itself be formed by molding in a die. Each cavity 83 is cylindrical terminating at the top in an expanded volume 85 (FIG. 5) of circular cross section capable of accommodating a funnel 87 (FIGS. 6,7,8) for depositing the powder. The diameters of the cavity 83 are precisely dimensioned. Typically the core which forms the lower portion of the cavity has a diameter which is maintained to plus or minus 0.001 inch. The diameter of this core in the lower region is typically about 0.430 inch.

Figure 4:
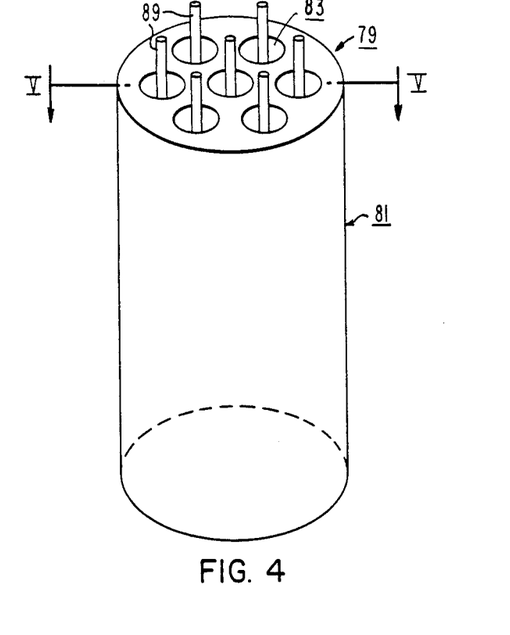
FIG. 4 is a view in isometric showing a multiple mold for producing the green bodies which are sintered to form the ceramic tubes in the practice of this invention.
Figure 5:
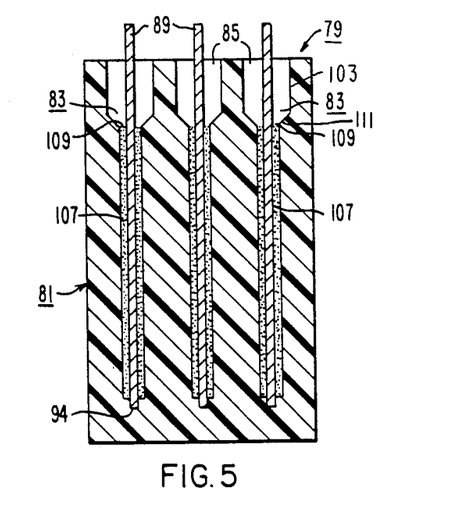
FIG. 5 is a longitudinal view in section taken along line V—V of FIG. 4.

A rod or mandrel 89 is precisely centered in each cavity 83. Each rod is composed of tool steel and is precisely dimensioned. The length of the rod 89 which is typically about 8 inches, for a cavity of about 7 inches in length, is maintained within plus or minus 0.001 inch; its diameter is maintained within plus or minus 0.001 inch. Typical diameters of the rod 89 are 0.2870 inch and 0.2830 inch.

The funnel 87 (FIGS. 6, 7) includes an outer shell 91 and an inner cylinder 93. The shell 91 and cylinder 93 are connected by radial plates 95. The inner diameter of the cylinder 93 typically is a slip fit on the rod 89 which extends into it. Typically the outer diameter of the cylinder 93 is 0.400 inch and is maintained to within plus 0.020 inch and minus 0.002 inch. The rod 89 is aligned in each cavity by the cylinder 93 and a precisely dimensioned groove 94 (FIG. 5) in the base of each cavity 83. The projection from the core which forms the groove 94 has a diameter which is maintained to within plus or minus 0.0005 and a height which is maintained to within plus or minus 0.005. Typically this diameter is 0.3100±0.0005 inch and this height is 0.125±0.005. The outer shell 91 includes a tapered section 95 interposed between a cylindrical section 97 above and a thickened short cylindrical section 99, from which a cylindrical lip 101 extends, below. The lip 101 is a slip fit in the upper rim of the wall 103 of the expanded volume 85 of the cavity (FIG. 8).

Figure 8:
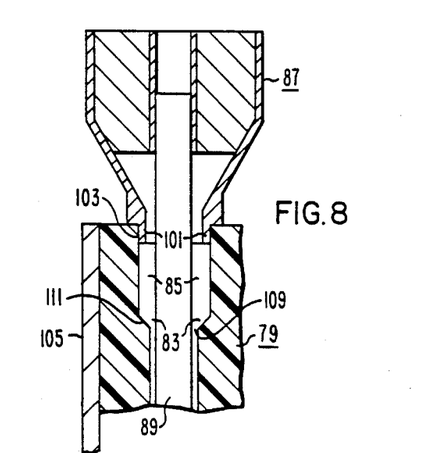
FIG. 8 is a fragmental view in longitudinal section showing the manner in which the powder is deposited in the mold.
Figure 9:
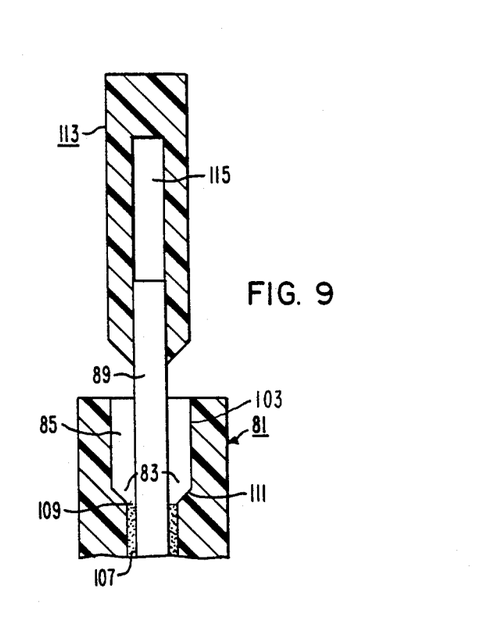
FIG. 9 is a fragmental view in section showing the manner in which the plug or cap is inserted in the cavity.

When the powder is to be deposited in the cavities 83, the mold is placed in a cylinder 105 (FIG. 8). The cylinder is a slip fit on the mold 81 and serves to maintain the mold rigid and to prevent the walls of its cavities 83 from becoming deformed. The mold 81 and cylinder 105 are vibrated on a vibrating table or the like while the powder 107 (FIG. 5) is being deposited in the cavities 83 through the funnel 87. The vibration distributes the powder 107 so that it is deposited uniformly in each cavity in the annular space between the rod 89 and the cylindrical wall of the cavity. The powder is deposited along this annular space up to the junction 109 of the cylindrical portion of the cavity and the start of the taper 111 to the space of larger volume 83. The funnel 87 is removed after the powder is deposited. The rod 89 is then maintained aligned by the powder 107 and the groove 94.

After the funnel is removed a plug 113 (FIG. 9) of polyurethane or the like is inserted in the opening 85. The plug is a slip fit in the wall 103 of this opening. The plug 113 has a central wall 115 onto which the top of rod 89 is a slip fit.

The next step 121 (FIG. 2) is to compress the powder in the cavities 83 to form green bodies of tubular configurations. The green bodies are porous and the percent of theoretical density is evaluated. The higher the percent of theoretical density the less shrinkage of the tube during sintering. To produce the green bodies, cavities 83 are closed by plugs 113 and the mold 81 is placed in an isostatic press. Such a press can be procured from Autoclave Engineers, Inc. of Erie, Pa. The pressure may vary from 5,000 to 60,000 pounds per square inch. A pressure of 30,000 pounds per square inch is convenient. This pressure is the limit of most typical isometric presses.

Figure 10:
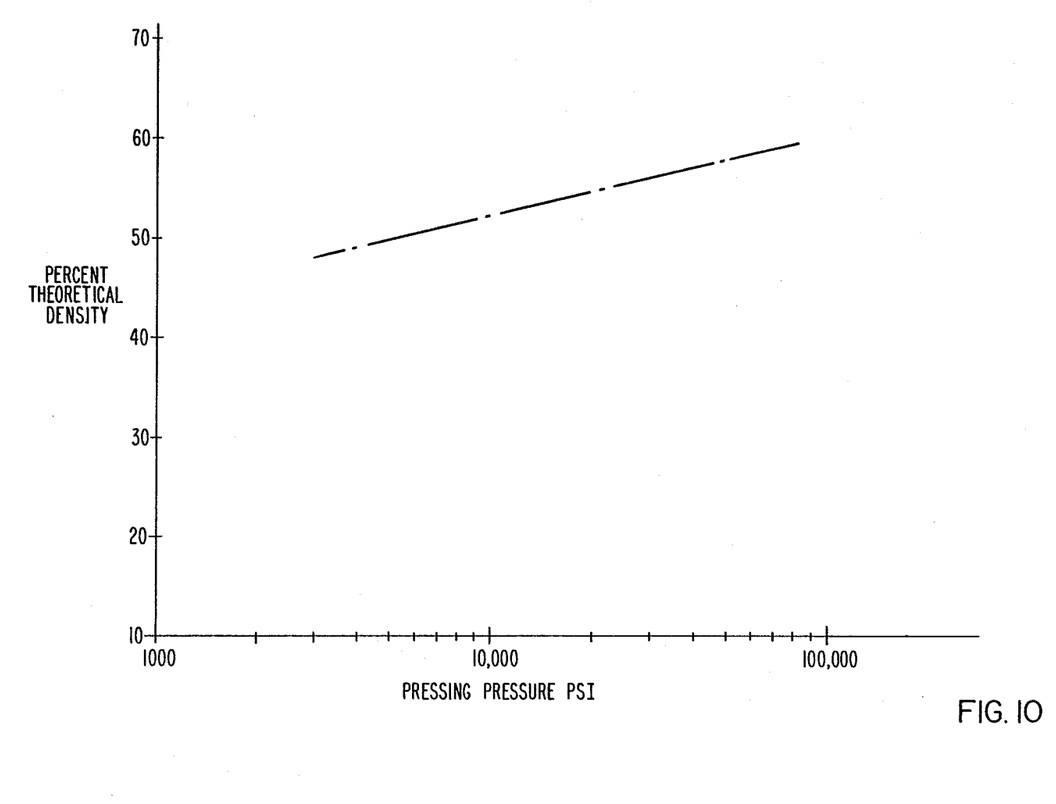
FIG. 10 is a graph showing typical relationship between the percent of theoretical density and the pressure for green ceramics produced in the practice of this invention.

It has been found that the increase in percent of theoretical density of the green body with increasing pressure is not significant. This is demonstrated by the graph shown in FIG. 10. This graph was produced by compressing masses of $Al_2O_3$ into green bodies by applying different isostatic pressures and measuring the percent of theoretical density for each pressure. Percent theoretical density is plotted vertically and pressure horizontally. The percent theoretical density of the body compressed at about 10,000 psi was 50 as compared to 60 at about 80,000 psi. A change of 1,000 psi produces only 0.14 change in the percent of theoretical density. The data on the $Al_2O_3$ applies to mixtures of $Al_2O_3$ and $B_4C$.

In the next step 123 (FIG. 2) the green body is presintered at a temperature sufficient to remove the organic binder and plasticizer. This step is optional.

The presintering step is followed by a sintering step 125. The sintering is at a temperature between 1400° C. and 1800° C.. During sintering the atoms of the $Al_2O_3$ matrix diffuse and the mass shrinks. The $B_4C$ particles remain essentially unchanged. The sintering should be carried out in such manner that the resulting body is sintered to size requiring only a minimum of external grinding.

It is necessary to form the pellets so as to prevent excessive swelling and possible destruction of the pellets by reason of neutron bombardment and release of helium gas during reactor operation. The sintering should be carried out so that the pellets are porous. Typically the porosity should be such that the density of the pellets is equal to or less than 70% of theoretical density. The porosity should be open so as to permit evolution of the helium. Since the density is substantially less than theoretical density, it is necessary to control the percent theoretical density accurately for all boron loadings to a predetermined magnitude. It is necessary to ensure that the green bodies sinter identically, or at least predicatably, from batch to batch and lot-to-lot so that the shrinkage during sintering can be controlled to obtain sintered tubes of requisite dimensions. This object is achieved by maintaining the same powder compositions and green body density during pressing and to use the same sintering schedule including temperature, environment and time of sintering. The powders which are used must be of consistent quality.

It has been found that to achieve the desired relatively low percent of theoretical density ($\leq 70\%$), the sintering should take place in an inert gas such as argon at about atmospheric pressure. By sintering in argon the percent of theoretical density can be controlled over a wide range of $B_4C$ content. There is no appreciable vaporization. Other gases present problems. $N_2$ can only be used at relatively low temperatures and for short intervals, typically 1400° C., and 3 hours. At higher temperatures or for longer times boron nitride is formed. Sintering in carbon dioxide results in oxidation of $B_4C$ to $B_2O_3$. Sintering in hydrogen is on the whole satisfactory but it results in lower densities of the sintered ceramic than sintering in argon. Also density of the ceramic progressively decreases with increase in temperature. Vacuum sintering can be used at lower temperatures, typically 1600° C. or lower. At higher temperatures, $B_4C$ and $Al_2O_3$ are lost by vaporization in the vacuum. Also, control of present or theoretical density of the vacuum-sintered ceramic is not effective.

Figure 11:
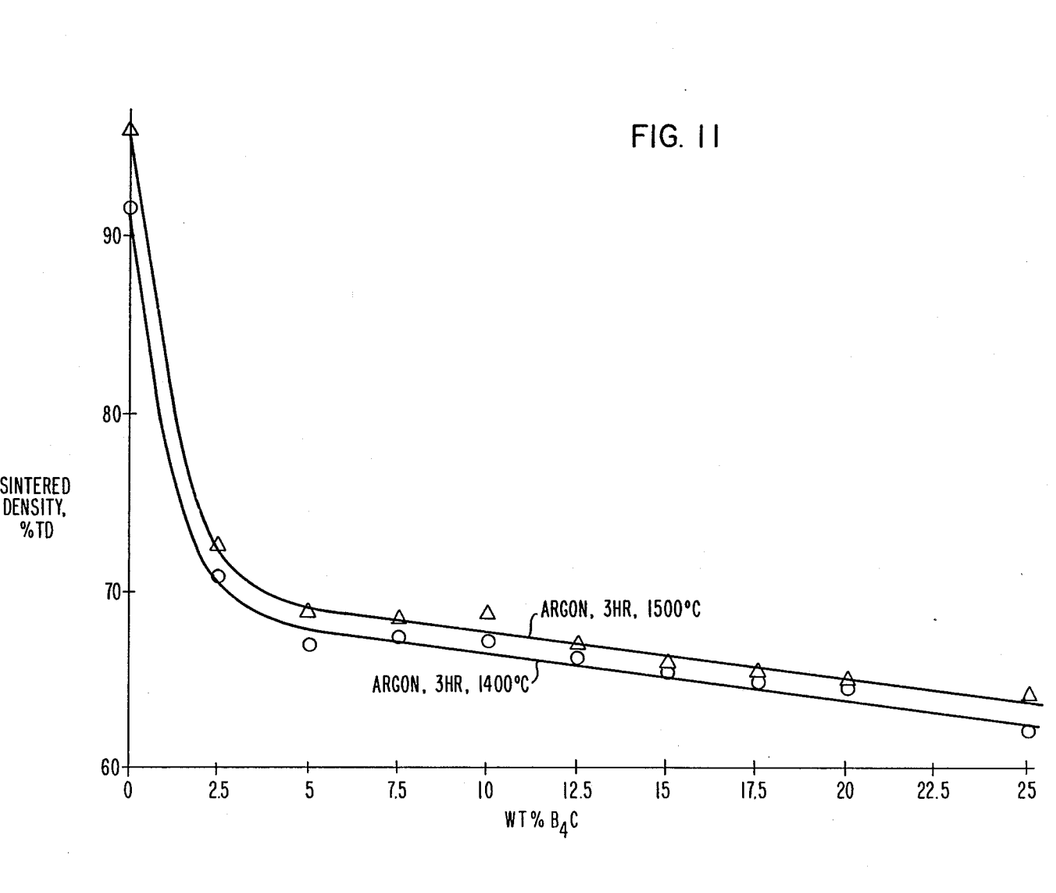
FIG. 11 is a graph showing the relationship between the sintered percent theoretical density at two sintering temperatures, of ceramics produced in the practice of this invention, and the content of $B_4C$.

FIG. 11 shows the relationship between the percent theoretical density of green bodies of $Al_2O_3$ and $B_4C$ and the content of $B_4C$ in the green bodies. The $Al_2O_3$ was powder sold under the designated A-16 by Alcoa. The sintering was carried out in argon at 1400° C. and at 1500° C. for 3 hours. Percent theoretical density is plotted vertically and weight percent of $B_4C$ in the green body horizontally. The percent theoretical density rises sharply for $B_4C$ content less than 2.5 percent but for higher $B_4C$ content, the change is relatively small. Between 2.5 and 25%, the percent decrease is from about 70 to about 65 at 1400° C. and from about 71 or 72 to about 64 or 63 at 1500° C.. Neither the sintering temperature nor the content in the green body of above 2.5% of $B_4C$ have a marked effect on the percent theoretical density.

Figure 12:
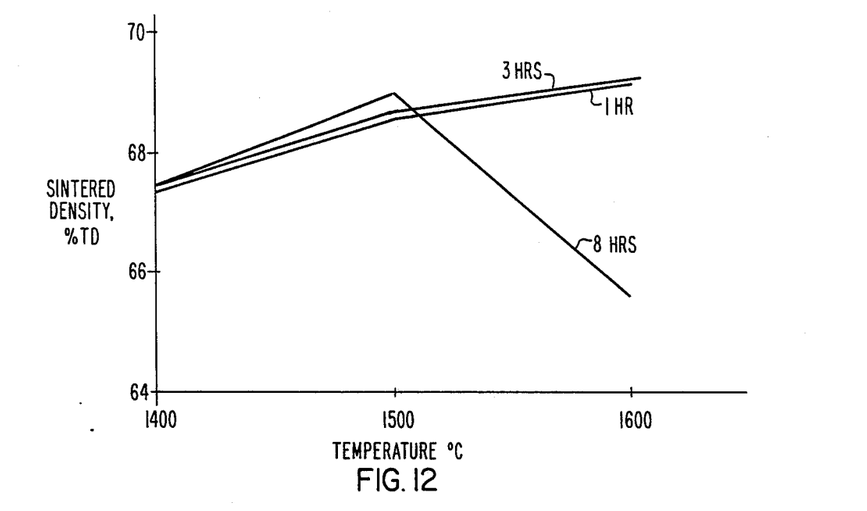
FIG. 12 is a graph showig the relationship between the percent theoretical density of ceramics produced in accordance with this invention and the sintering temperature, for sintering for three different durations.

Sintering time is an important parameter where the time is substantially higher than about 3 hours. In FIG. 12 percent theoretical density is plotted vertically as a function of sintering temperature plotted horizontally. A family of curves for three times, 1 hour, 3 hours and 8 hours are presented. The curves were plotted for ceramics composed of 80% by weight of Alcoa-A16 $Al_2O_3$ and 20% $B_4C$ sintered in argon. The percent theoretical density is substantially the same for sintering for 1 hour and 3 hours and for sintering for 8 hours at temperatures below 1500° C. But above 1500° C. for 8 hours the percent theoretical density decreases sharply with increase in temperature; i.e., the porosity rises sharply. This increase in porosity results from the reaction of $B_4C$ with the residual oxygen in the argon-forming gaseous species at the higher temperatures during the extended heating interval. It is desirable that the argon gas be as pure as practicable for higher-temperature or extended-time sintering.

Figure 13:
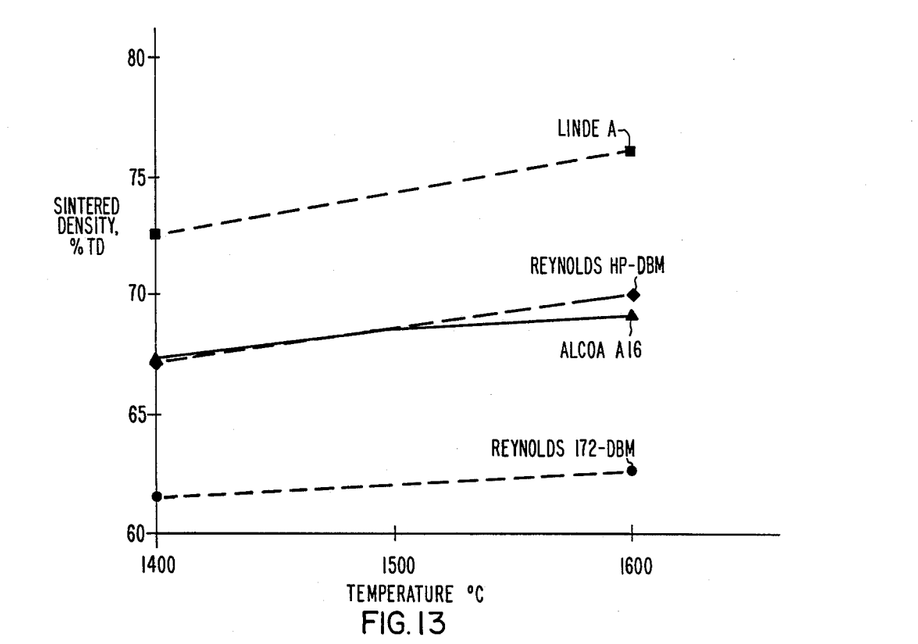
FIG. 13 is a graph showing the relationship between the percent theoretical density of ceramics produced in the practice of this invention and sintering temperature for different $Al_2O_3$ powders.

That the percent theoretical density may be set by appropriate selection of the $Al_2O_3$ powder is shown in FIG. 13. In this graph percent theoretical density is plotted vertically and temperature horizontally. A family of curves is presented. Each curve is plotted for the sintering in argon of a green body composed of 80% by weight of a selected $Al_2O_3$ and 20% $B_4C$. The green body with Reynolds 172-DBM manifests the lowest percent theoretical density; i.e., the highest porosity; Linde-A manifests the highest percent theoretical density. Alcoa-A16 and Reynolds HP-DBM did not differ significantly. The differences are governed by the sinterability of the powder; i.e., by the extent of the diffusion of the molecules and atoms of the powder during the sintering operation.

Changes in percent theoretical density can also be effected by appropriate selection of the particle size of the $B_4C$. Higher percent theoretical densities of the ceramic are obtained with fine powders, typically less than 400 mesh, than with coarse powder, typically greater than 200 mesh.

In the final steps, 127 and 129 the outer surface of the tube can be ground and the pellet lengths are accurately finished to length.

The pellet lengths may also be cut from the green tube or from the presintered tube. If desired the green or presintered pellets can be machined to size prior to sintering.

Tables I and II below show typical constituents, based on 100 grams of $Al_2O_3$ and $B_4C$ powder, of feed material for isostatic pressing in the practice of this invention:

A slurry of the constituents in Tables I and II was formed with about 150 grams of water.

Lomar is procured from Process Chemical Division, Norristown, N.J.

Carbowax 200 and Ucon 2000 are procured from Union Carbide, New York, N.Y.

Triton, Tamol, and Rhoplex are procured from Rohn & Hass, Pelham Manor, N.J.

Santicizer is procured from Monsanto Chemical Company

While preferred embodiments of this invention have been disclosed herein, many modifications thereof are feasible. This invention is not to be restricted except insofar as is necessitated by the spirit of the prior art.

What we claim is:

1. The method of making an annular neutron-absorber body for use as a burnable poison in a nuclear reactor, said body being porous and having substantially uniform density, the radial thickness of said body being small and substantially uniform, throughout its length, the said method comprising:
(a) mixing a first powder with a second powder, said first powder to form a matrix, and being selected from one or more of the class consisting of aluminum oxide ($Al_2O_3$) and zirconium oxide ($ZrO_2$), said second powder being a neutron absorber and being selected from one or more of the class of elements consisting of boron, gadolinium, samarium, cadmium, europium, hafnium, dysprosium and indium or their compounds;
(b) milling and grinding the mixture of said first powder and said second powder in a liquid to produce a slurry in which said powders are homogenized and coarse agglomerates are eliminated, said slurry including water, and small but effective quantities of a wetting agent;
(c) drying said slurry to produce a dry mass of said mixture of said first and second powders;
(d) adding to said mass of powders means capable of adding strength to a green body to be formed of said mass of powders;
(e) depositing said mass of powders into a mold in which said mass may be subjected to isostatic pressure;
(f) subjecting said mass of powders in said mold to isostatic pressure to form a green body having the form of an annular neutron-absorber body; and
(g) heating said green body at a temperature such as to drive off said strength-adding means and to sinter said green body to form said neutron-absorber body.

2. The method of claim 1 wherein the slurry includes, in addition to the wetting agent, a small but effective quantity of a deflocculant which suppresses the formation of agglomerates.

3. The method of making an annular neutron-absorber body for use as a burnable poison in a nuclear reactor, said body being porous and having substantially uniform density, the radial thickness of said boyd being small and substantially uniform, throughout its length, the said method comprising:
(a) mixing a first powder with a second powder, said first powder to form a matrix, and being selected from one or more of the class consisting of aluminum oxide ($Al_2O_3$) and zirconium oxide ($ZrO_2$), said second powder being a neutron absorber and being selected from one or more of the class of elements consisting of boron, gadolinium, samarium, cadmium, europium, hafnium, dysprosium and indium or their compounds;
(b) milling and grinding the mixture of said first powder and said second powder in a liquid to produce a slurry in which said powders are homogenized and coarse agglomerates are eliminated;
(c) drying said slurry to produce a dry mass of said mixture of said first and second powders;
(d) adding to said mass of powders means capable of adding strength to a green body to be formed of said mass of powders;
(e) inserting a mold capable of transmitting pressure for receiving deposit of said mass of powders in a rigid body so as to maintain said mold rigid during said deposit;
(f) while said mold is so inserted in said rigid body depositing said mass of powders in said mold;
(g) subjecting said mass of powders in said mold to isostatic pressure to form a green body having the form of an annular neutron-absorber body; and
(h) heating said green body at a temperature such as to sinter said green body to form said neutron-absorber body.

4. The method of claim 3 including the step of vibrating the mold in said rigid body during the deposit of the powder so that the powder is deposited uniformly.

5. The method of making an annular neutron-absorber body for use as a burnable poison in a nuclear reactor, said body being porous and having substantially uniform density, the radial thickness of said body being small and substantially uniform, throughout its length, the said method comprising:
(a) mixing a first powder with a second powder, said first powder to form a matrix, and being selected from one or more of the class consisting of aluminum oxide ($Al_2O_3$) and zirconium oxide ($ZrO_2$), said second powder being a neutron absorber and being selected from one or more of the class of elements consisting of boron, gadolinium, samarium, cadmium, europium, hafnium, dysprosium and indium or their compounds;
(b) milling and grinding the mixture of said first powder and said second powder in a liquid to produce a slurry in which said powders are homogenized and coarse agglomerates are eliminated, said liquid in which said mixture of said first powder and said second powder is ground including a deflocculant which suppresses the formation of agglomerates;
(c) drying said slurry to produce a dry mass of said mixture of said first and second powders;
(d) adding to said mass of powders means capable of adding strength to a green body to be formed of said mass of powders;
(e) depositing said mass of powders into a mold in which said mass may be subjected to isostatic pressure;
(f) subjecting said mass of powders in said mold to isostatic pressure to form a green body having the form of an annular neutron-absorber body; and
(g) heatign said green body at a temperature such as to drive off said strength-adding means and to sinter said green body to form said neutron-absorber body.

6. The method of making a plurality of annular neutron-absorber pellets for use as a burnable poison in a nuclear reactor, each said pellet being porous and having substantially uniform density, the thickness of each said pellet being small and substantially uniform, throughout the length of said each pellet, the said method comprising:
(a) mixing a first powder with a second powder, said first powder to form a matrix, and being selected from one or more of the class consisting of aluminum oxide ($Al_2O_3$) and zirconium oxide ($ZrO_2$), said second powder being a neutron absorber and being selected from one or more of the class of elements consisting of boron gadolinium, samarium, cadmium, europium, hafnium, dysprosium and indium or their compounds;
(b) milling and grinding the mixture of said first powder and second powder in a liquid to produce a slurry in which said powders are homogenized and coarse agglomerates are eliminated;
(c) drying said slurry to produce a dry mass of said mixture of said first and second powders;

(d) adding to said mass of powders means capable of adding strength to a green body to be formed of said mass of powders;

(e) depositing said mass of powders into a mold in which said mass may be subjected to isostatic pressure;

(f) subjecting said mass of powders in said mold to isostatic pressure to form a green body having a length equal to the sum of the lengths of said plurality of pellets;

(g) heating said green body at a temperature such as to drive off said strength-adding means and to sinter said green body to form a neutron-absorber body of said length;

(h) grinding the outer surface of the sintered body; and (i) thereafter cutting up said neutron-absorber body to form said plurality of pellets.

7. The method of making an annular neutron-absorber body from which pellets for use as a burnable poison in a nuclear reactor are to be formed, said body having an open porosity such as to prevent excessive swelling and destruction of said pellets by reason of neutron bombardment and release of helium gas during reactor operation and having substantially uniform density, the radial thickness of said body beig small and substantially uniform, throughout its length, the said method comprising:

(a) mixing a first powder with a second powder, said first powder to form a matrix, and being selected from one or more of the class consisting of aluminum oxide ($Al_2O_3$) and zirconium oxide ($ZrO_2$), said second powder being a neutron absorber and being selected from one or more of the class of elements consisting of boron, gadolinium, samarium, cadmium, europium, hafnium, dysprosium and indium or their compounds;

(b) milling and grinding the mixture of said first powder and said second powder in a liquid to produce a slurry in which said powders are homogenized and coarse agglomerates are eliminated;

(c) drying said slurry to produce a dry mass of said mixture of said first and second powders;

(d) adding to said mass of powders means capable of adding strength to a green body to be formed of said mass of powders;

(e) depositing said mass of powders into a mold in which said mass may be subjected to isostatic pressure;

(f) subjecting said mass of powders in said mold to isostatic pressure to form a green body having the form of said annular neutron-absorber body; and (g) heating said green body at a temperature such as to drive off said strength-adding means and to sinter said green body to form said neutron-absorber body.

8. The method of claim 7 characterized by that to achieve the desired porosity the sintering is carried out in an inert gas having a high purity at about atmospheric pressure.

9. The method of claim 8 wherein the sintering is carried out for an interval not substantially greater than about three hours at a temperature of between about 1400° C. and about 1600° C.

10. The method of claim 7 including the additional step of setting the porosity by appropriate selection of the matrix and sintering between about 1400° C. and 1600° C.

11. The method of claim 22 characterized by that the first powder is $Al_2O_3$ and the second powder mixed with said $Al_2O_3$ as recited in paragraph (a) of claim 22 is $B_4C$, the $B_4C$ being present in an amount not less than about 2½ weight percent.

12. The method of making an annular neutron-absorber body from which pellets for use as a burnable poison in a nuclear reactor are to be fo rmed, said body having an open porosity such as to prevent excessive swelling and destruction of the pellets by reason of neutron bombardment and release of helium gas during reactor operation, said porosity being such that the body has a density equal to or less than 70% of theoretical density, the radial thickness of said body being small and substantailly uniform, throughout its length, the said method comprising:

(a) mixing a first powder with a second powder, said first powder to form a matrix, and being selected from one or more of the class consisting of aluminum oxide ($Al_2O_3$) and zirconium oxide ($ZrO_2$), said second powder being a neutron absorber and being selected from one or more of the class of elements consisting of boron, gadolinium, samarium, cadmium, europium, hafnium, dydprosium and indium or their compounds;

(b) milling and grinding the mixture of said first powder and said second powder in a liquid to produce a slurry in which said powders are homogenized and coarse agglomerates are eliminated;

(c) drying said slurry to produce a dry mass of said mixture of said first and second powders;

(d) adding to said mass of powders means capable of adding strength to a green body to be formed of said mass of powders;

(e) depositing said mass of powders into a mold in which said mass may be subjected to isostatic pressure;

(f) subjecting said mass of powders in said mold to isostatic pressure to form a green body having the form of said annular neutron-absorber body; and (g) heating said green body at a temperature such as to drive off said strenght-adding means and to sinter said green body to form said neutron-absorber body.

13. The method of making an annular neutron-absorber body for use as a burnable poison in a nuclear reactor, said body being porous and having substantially uniform density, the radial thickness of said body being small and substantially uniform, throughout its length, the said method comprising:

(a) mixing a first powder with a second powder, said first powder to form a matrix, and being selected from one or more of the class consisting of aluminum oxide ($Al_2O_3$) and zirconium oxide ($ZrO_2$), said second powder being a neutron absorber and being selected from one or more of the class of elements consisting of boron, gadolinium, samarium, cadmium, europium, hafnium, dysprosium and indium or their compounds;

(b) milling and grinding the mixture of said first powder and said second powder in a liquid to produce a slurry in which said powders are homogenized and coarse agglomerates are eliminated;

(c) drying said slurry to produce a dry mass of said mixture of said first and second powders;

(d) adding to said mass of powders means capable of adding strength to a green body to be formed of said mass of powders;

(e) depositing said mass of powders into a mold of a material capable of transmitting pressure;
(f) subjecting said mass of powders in said mold to isostatic pressure to form a green body having the form of said annular neutron-absorber body; and
(g) heating said green body at a temperature such as to drive off said strength-adding means and to sinter said green body to form said neutron-absorber body.

* * * * *